United States Patent
Komatsu et al.

(12) United States Patent (10) Patent No.: US 7,552,659 B2
Komatsu et al. (45) Date of Patent: Jun. 30, 2009

(54) GEARSHIFT DEVICE FOR AUTOMATIC TRANSMISSION

(75) Inventors: Atsushi Komatsu, Wako (JP); Kotaro Hiramine, Wako (JP); Yoshiharu Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 353 days.

(21) Appl. No.: 11/424,143

(22) Filed: Jun. 14, 2006

(65) Prior Publication Data

US 2006/0283276 A1 Dec. 21, 2006

(30) Foreign Application Priority Data

Jun. 15, 2005 (JP) ............... 2005-174844

(51) Int. Cl.
*F16H 59/00* (2006.01)
*B60K 20/00* (2006.01)

(52) U.S. Cl. ........................ 74/335; 74/473.1

(58) Field of Classification Search ............... 74/335, 74/473.1, 473.12; 324/207.2, 207.24
See application file for complete search history.

(56) References Cited

U.S. PATENT DOCUMENTS 5,307,013 A * 4/1994 Santos et al. ............. 324/207.2
6,064,197 A * 5/2000 Lochmann et al. ........ 324/207.14
6,205,874 B1 * 3/2001 Kupper et al. ................ 74/335
6,761,081 B2 * 7/2004 Kliemannel ................... 74/335
2002/0189381 A1 * 12/2002 Kliemannel et al. ........... 74/335
2007/0137337 A1 * 6/2007 Kim ............................. 74/335

FOREIGN PATENT DOCUMENTS

FR 2692956 A1 * 12/1993 ............. 74/473.1
JP 2000-123686 4/2000
JP 2000-161986 6/2000
JP 2001-341542 12/2001

* cited by examiner

*Primary Examiner*—Roger Pang
(74) *Attorney, Agent, or Firm*—Rankin, Hill & Clark LLP

(57) ABSTRACT

A gearshift device includes a gearshift lever adapted to move a plurality of gear selection positions, and a gear selection position detecting unit which detects a gear selection position. The gear selection position detecting unit has a magnet plate disposed at a lower end portion of the gearshift lever and movable in accordance with a movement of the gearshift lever and primary magnetic sensors and at least one secondary magnetic sensor, which are disposed so as to oppose to the magnet plate in a non-contact fashion at predetermined positions based on the individual gear selection positions. The primary magnetic sensor detects magnetic flux density and outputs ON/OFF signals in accordance with intensity of the detected magnetic flux density The secondary magnetic sensor detects magnetic flux density and outputs an output value according to the detected magnitude of the magnetic flux density.

6 Claims, 5 Drawing Sheets

FIG. 6

| GEAR SELECTION POSITIONS / SENSORS | S1 | S2 | S3 | S4 | R1 | R2 |
|---|---|---|---|---|---|---|
| R | 0 | 0 | 0 | 0 | L | L |
| N | 1 | 0 | 0 | 0 | M | L |
| H | 0 | 0 | 1 | 0 | M | M |
| D | 0 | 1 | 1 | 1 | M | H |
| L | 0 | 0 | 0 | 1 | H | H |

GEARSHIFT DEVICE FOR AUTOMATIC TRANSMISSION

The present invention claims foreign priority to Japanese patent application No. P.2005-174844, filed on Jun. 15, 2005, the contents of which is incorporated herein by reference.

BACKGROUND OF THE INVENTION

1. Field of the Invention

The present invention relates to a gearshift device for an automatic transmission installed on a vehicle.

2. Description of the Background Art

In recent years, as gearshift devices for automatic transmissions installed on vehicles, so-called shift-by-wire type gearshift devices have been proposed which are advantageous in reduction in operating force as well as size of the gearshift devices. The shift-by-wire type gearshift devices are such that a gear selection position where a gearshift lever is operated to be situated by the driver is detected by a sensor so that gear ranges of an automatic transmission (hereinafter, referred simply to AT) are changed over by an actuator based on a detection signal or such that the gear ranges of the AT are changed over through electric control (for example, refer to Japanese Patent Unexamined Publication No. JP-A-2001-341542).

Incidentally, in a gearshift device of JP-A-2001-341542, four sensors are arranged so as to match four gear selection positions, such as (N (neutral), R (reverse), D (drive),+(upshift),-(downshift)) of a gearshift lever, respectively. However, in the sensor arrangement like this, in the event that any of the sensors fails to thereby be unable to output a sensor signal, a gear range change in the AT corresponding to the gear selection position for which the failed sensor is arranged cannot be effected even when the gearshift lever is shifted into the relevant gear selection position.

To cope with this, there can be considered a configuration in which two or more sensors are arranged for each gear selection position in order to have redundancy, so that even though one of the sensors so arranged fails, the output of a sensor signal can be ensured. In this case, however, the number of sensors to be arranged increases at least twofold or more, and this increases the production costs.

SUMMARY OF THE INVENTION

Then, an object of the invention is to provide a gearshift device for an automatic transmission which can detect a gear selection position while securing the redundancy with a small number of sensors.

With a view to accomplishing the object, according to the invention, there is provided a gearshift device for an automatic transmission, comprising:

a gearshift lever adapted to move a plurality of gear selection positions along a gearshift lever shifting groove; and a gear selection position detecting unit which detects a gear selection position into which the gearshift lever is operated to be shifted, the gear selection position detecting unit comprising:

a magnet plate which is disposed at a lower end portion of the gearshift lever and is adapted to move in accordance with a movement of the gearshift lever; and a plurality of primary magnetic sensors and at least one secondary magnetic sensor, which are disposed so as to oppose to the magnet plate in a non-contact fashion at predetermined positions based on the individual gear selection positions, wherein the primary magnetic sensor detects magnetic flux density of the magnet plate and outputs ON/OFF signals in accordance with intensity of the detected magnetic flux density; and the secondary magnetic sensor detects magnetic flux density of the magnet plate and outputs an output value according to the detected magnitude of the magnetic flux density.

According to the first aspect of the invention, the primary magnetic sensors output ON/OFF signals according to the intensity of magnetic flux densities detected according to the gear selection position where the gearshift lever is operated to be situated, and the secondary magnetic sensor outputs an output value according to the magnitude of the magnetic flux density detected according to the gear selection position where the gearshift lever is operated to be situated, whereby the gear selection position can be detected based on the respective sensor outputs (sensor signals) of the primary magnetic sensors and the secondary magnetic sensor.

In addition, according to a second aspect of the invention, there is provided a gearshift device for an automatic transmission as set forth in the first aspect of the invention, it is preferable that the magnet plate is a multipolar magnet plate comprising a plurality of flat plate-shaped magnets disposed in such a manner that an N pole and an S pole lie adjacent to each other, the primary magnetic sensor outputs the ON/OFF signals when the primary magnetic sensor detects changes in a detection property in the N pole and a detection property in the S pole, and wherein the secondary magnetic sensor output the output value in accordance with the detected magnetic flux density of the N or S poles of the multipolar magnet plate.

According to the second aspect of the invention, the magnet plate is the multipolar magnet plate comprising the plurality of flat plate-shaped magnets in such a manner that the N pole and the S pole lie adjacent to each other. A change in polarity between the N pole and the S pole in association with the movement of the multipolar magnet plate is detected by the primary magnetic sensors, whereby variation in magnetic flux density can be suppressed when compared to a case where an ON/OFF signal is outputted according to the intensity of the magnetic flux density in either the N pole or the S pole. Therefore, it is possible to output an ON/OFF signal in a more stable fashion.

According to a second aspect of the invention, there is provided a gearshift device for an automatic transmission as set forth in the first aspect of the invention, it is preferable that the primary and secondary magnetic sensors are provided in such a manner that:

when the gearshift lever moves from one of the gear selection position to another gear selection position, at least one of the output of primary magnetic sensors and at least one of the output of the secondary sensor are changed.

According to the first aspect of the invention, the primary magnetic sensors output two sensor outputs of ON/OFF signals according to the intensity of the magnetic flux densities detected according to the gear selection position where the gearshift lever is operated to be situated. In addition, the secondary magnetic sensor outputs an output value according to the change in the magnetic flux density detected according to the gear selection position where the gearshift lever is operated to be situated, whereby a plurality of different sensor outputs can be obtained by dividing this output value by an arbitrary threshold value. Consequently, the gear selection position can be detected with the small number of sensors while securing the redundancy by arranging the plurality of primary magnetic sensors and at least the one secondary magnetic sensor at the predetermined positions, respectively, in such a manner as to face the magnet plate.

In addition, according to the second aspect of the invention, since ON/OFF signals can be outputted from the primary magnetic sensors with better accuracy, the gear selection positions can be detected in a more stable fashion.

BRIEF DESCRIPTION OF THE DRAWINGS

FIG. 6 is a chart which shows sensor signals which are outputted from the individual sensors when the gearshift lever is shifted into the individual gear selection positions.

DETAILED DESCRIPTION OF THE PREFERRED EMBODIMENTS

Figure 1:
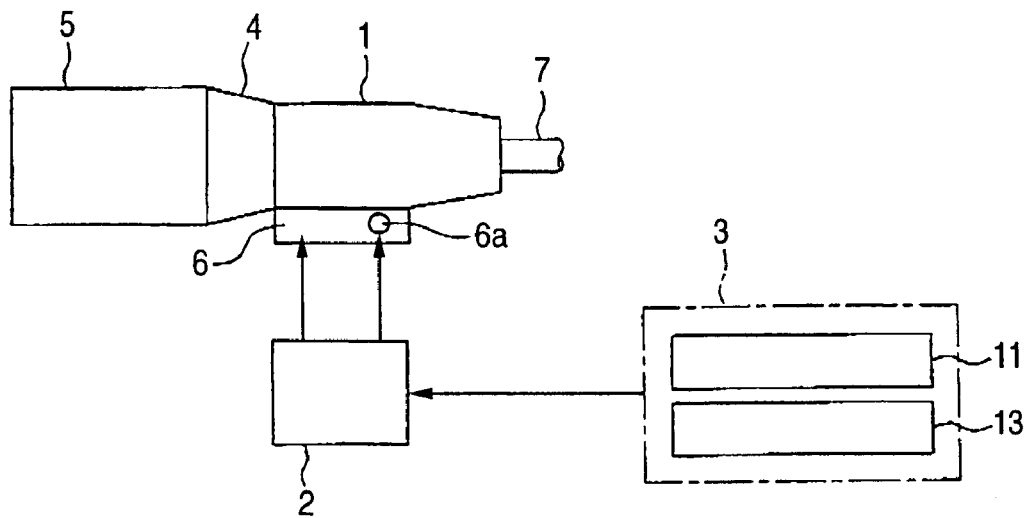
FIG. 1 is a schematic diagram which shows the configuration of a gearshift device for an automatic transmission according to an embodiment of the invention.
Figure 2:
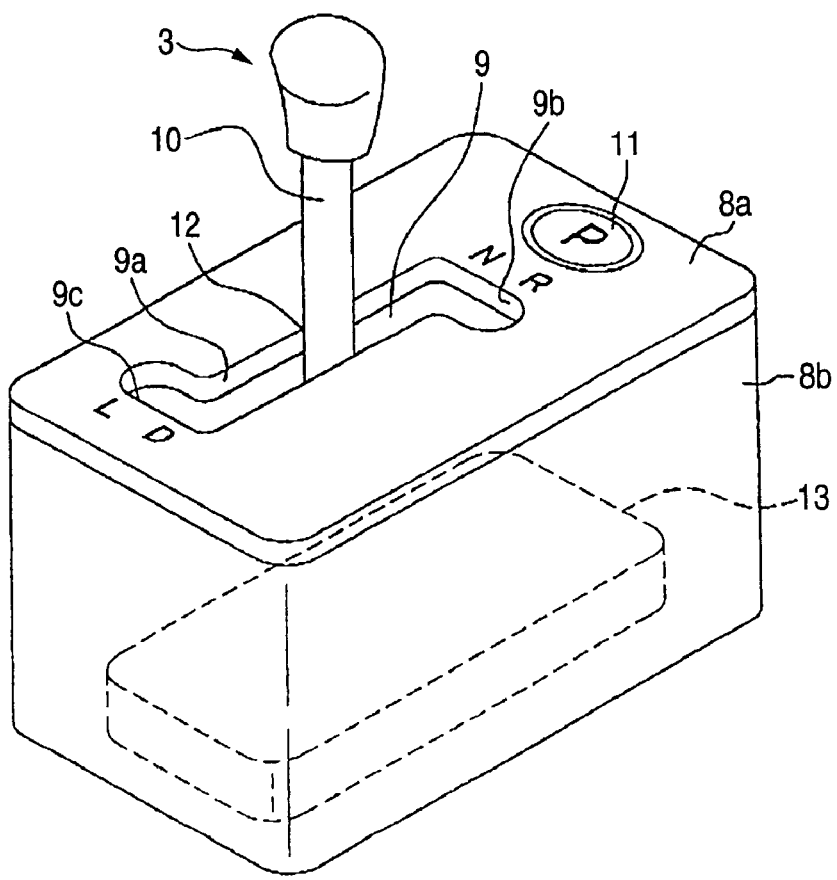
FIG. 2 is a schematic perspective view which shows the gearshift device according to the embodiment of the invention.
Figure 3:
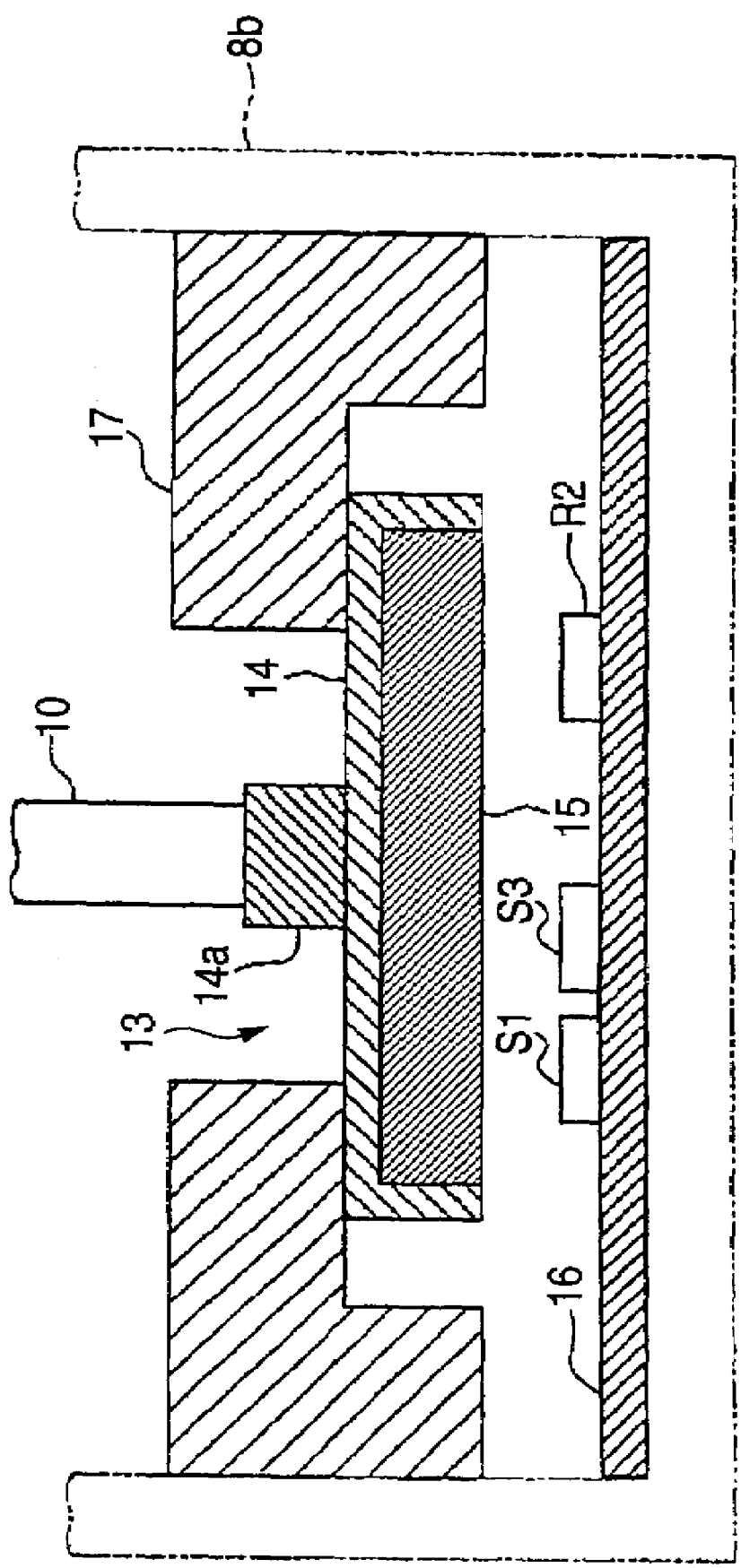
FIG. 3 is a schematic sectional view which shows a gear selection position detecting device in the embodiment of the invention.

Hereinafter, the invention will be described based on an embodiment illustrated in the accompanying drawings. FIG. 1 is a schematic diagram which shows the configuration of a gear shift system for an automatic transmission according to an embodiment of the invention. FIG. 2 is a schematic perspective view which shows the gearshift device according to the embodiment of the invention. FIG. 3 is a schematic sectional view of the gearshift device according to the embodiment of the invention.

As shown in FIG. 1, a gearshift device 3 is electrically connected to an AT (Automatic Transmission) 1 via a control unit (ECU) 2. The AT 1 is coupled to an engine output shaft (not shown) of an engine 5 via a torque converter 4. An electric actuator 6a is provided in a hydraulic pressure control unit 6 of the AT 1 for performing the changeover of gear ranges of the AT 1. Both the hydraulic pressure control unit 6 and the electric actuator 6a are controlled to be driven based on a control signal from the control unit 2.

The control unit 2 is electrically connected to the shift-by-wire type gearshift device 3 provided inside a passenger compartment. Detection signal (sensor signal) according to a gear selection position, where a gearshift lever 10 (refer to FIG. 2) of the gearshift device 3 is situated, is inputted into the control unit 2 from a gear selection position detecting device 13. The control unit 2 outputs control signal to the hydraulic pressure control unit 6 and the electric actuator 6a so as to control to drive them based on detection signal inputted thereinto from the gear selection position detecting device 13 of the gearshift device 3.

In this embodiment, the AT 1 has gear ranges such as a P (parking) range, a R (reverse) range, an N (neutral) range, a D (drive) range, and a L (low-gear) range, and the individual gear ranges are set to be arranged in the order of P range, R range, N range, D range and L range. Note that when the N range is selected in the AT 1, a neutral state is provided in which a power transmission is interrupted between an engine 5 side and a drive wheels (not shown) side of the AT 1. When the P range is selected, not only is the neutral state provided in which a power transmission between the engine 5 side and the drive wheels side interrupted but also a parking lock mechanism (not shown) is activated so as to mechanically lock an output shaft 7 of the AT 1.

As shown in FIG. 2, in the gearshift device 3, a gate groove 9 which forms a gearshift lever shifting pattern is provided in an upper cover 8a, and a gearshift lever 10 is passed through this gate groove 9. Note that the gearshift device 3 is placed on a floor (not shown) in the vicinity of, for example, a driver's seat.

The gate groove 9 has a first gate groove 9a which extends in a straight line along a longitudinal direction of the vehicle; a second gate groove 9b which is formed to extend rightwards from a front end (an upper right-hand side of in FIG. 2) of the first gate groove 9a; and a third gate groove 9c which is formed to extend leftwards from a rear end (a lower left-hand side of in FIG. 2) of the first gate groove 9a. An N (neutral) position lies in the vicinity of the front end (the upper right-hand side of FIG. 2) of the first gate groove 9a. A D (drive) position lies in the vicinity of the rear end (the lower left-hand side of FIG. 2) of the first gate groove 9a. An R (reverse) range lies within the second gate groove 9b. An L (drive-range low-gear or low-gear) position lies within the third gate groove 9c. Symbols such as "R", "N", "D" and "L" are given on the periphery of the gate groove 9 in such a manner as to face the gear selection positions R, N, D and L, respectively. Note that the gear selection positions R, N, D and L in the gate groove 9 correspond to the R range, N range, D range and L range in the AT 1, respectively.

In addition, a push-button type P (parking) activation button 11 is provided on a front end side (the upper right-hand side of FIG. 2) of the upper cover 8a.

Provided within a case main body 8b of the gearshift device 3 are a support mechanism (not shown) which supports the gearshift lever 10 in such a manner as to rock along the gate groove 9 (the first gate groove 9a, the second gate groove 9b, the third gate groove 9c); and a restoration mechanism (not shown) which automatically restore the gearshift lever 10 to a home position (hereinafter, refer simply to an H position) 12 when the driver removes his or her hand from the gearshift lever 10 after he or she has shifted it into either the N position or the D position in the first gate groove 9a. Note that as this occurs, the AT 1 is held in either the N range or the D range even in a state where the gearshift lever 10 is restored to the H position 12.

When shifted into the second gate groove 9b which is the R position, and when shifted into the third gate groove 9c which is the L position, the gearshift lever 10 is constructed so as to be held in the positions by a detent mechanism (not shown). The release of the detention can be effected by pushing the gearshift lever 10 to return it to the first gate groove 9a side. Note that at the time of P (parking) which is realized by pressing the P activation button 11, the gearshift lever 10 lies in the H position 12.

In addition, as shown in FIGS. 2 and 3, the gear selection position detecting device 13, which is adapted to detect a gear selection position (a shift position) into which the gearshift lever 10 is shifted, is provided within the case main body 8b of the gearshift device 3. As shown in FIG. 3, the gear selection position detecting device 13 includes a quadrangular multipolar magnet plate 15 which is fixedly held with a recessed portion formed in a magnet support member 14, a quadrangular substrate 16 which is disposed below (on a lower side of FIG. 3) the multipolar magnet plate 15 in such a manner as to face the multipolar magnet plate 15, a plurality (four in this embodiment) of ON/OFF sensors S1, S2, S3 and S4 which are arranged on a surface (a multipolar magnet plate 15 side surface) of the substrate 16 (refer to FIG. 4A) and a plurality (two in this embodiment) of linear sensors R1, R2 (refer to FIG. 4A).

As shown in FIG. 3, a lower end portion of the gearshift lever 10 is connected to a connecting portion 14a provided on an upper surface of the magnet support member 14. The multipolar magnet plate 15 lying inside the magnet support member 14 which is placed slidably relative to a lower surface of a guide member 17 is made to move in substantially parallel with the substrate 16 as the gearshift lever 10 is operated.

Figure 4A:
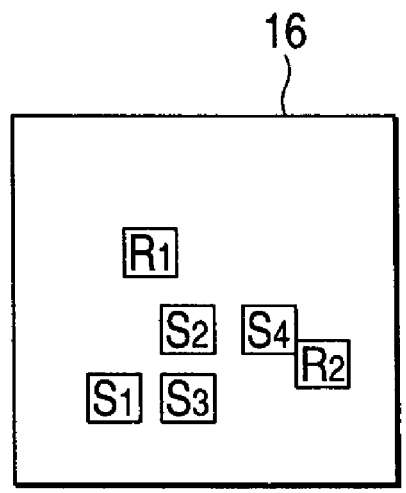
FIG. 4A is a drawing which shows a layout pattern of individual sensors arranged on a substrate.

As shown in FIG. 4A, the ON/OFF sensors S1, S3 and the ON/OFF sensors S2, S3 are arranged so as to be close to each other in a transverse direction of the vehicle (a horizontal direction in the figure), respectively. The ON/OFF sensor S2 is arranged so as to lie closely to the front of the ON/OFF sensor S3 relative to the longitudinal direction of the vehicle (a vertical direction in the figure). In addition, the linear sensor R1 is arranged so as to be close to the front of the ON/OFF sensor S2 while lying diagonally leftwards relative to the longitudinal direction of the vehicle (the vertical direction in the figure). The linear sensor R2 is arranged so as to be in contact with the rear of the ON/OFF sensor S4 while lying diagonally rightwards relative to the transverse direction of the vehicle (the horizontal direction in the figure).

Figure 4B:
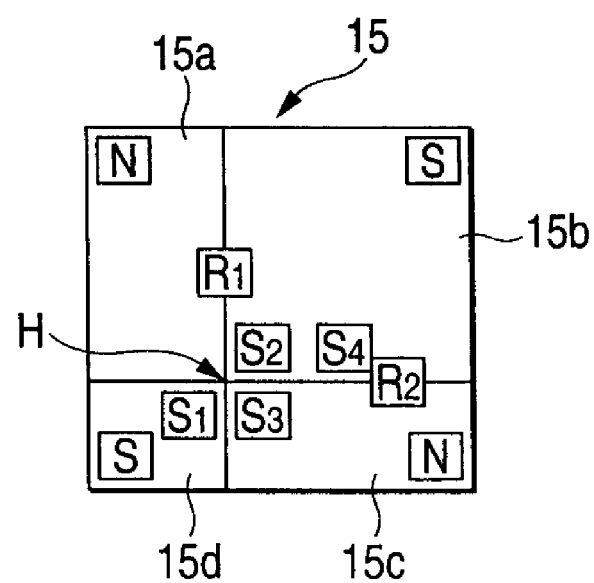
FIG. 4B is a drawing which shows a relative positional relationship between the individual sensors and a multipolar magnet plate resulting when a gearshift lever is shifted into an H position.

As shown in FIG. 4B, the magnet plate 15 is bonded to the magnet support member 14 in such a manner that as viewed from the side of the substrate 16, four quadrangular magnets 15a, 15b, 15c, 15d contact together substantially at a single point at respective corner portions in a clockwise direction. The individual quadrangular plate-shaped magnets 15a to 15d are arranged in such a manner as that respective N pole, S pole, N pole and S pole of the magnets face the substrate 16. Note that FIG. 4B shows a face-to-face positional relationship between the individual magnets 15a to 15d of the multipolar magnet plate 15 and the individual sensors (the ON/OFF sensors S1, S2, S3, S4 and the linear sensors R1, R2) on the substrate 16 when the gearshift lever 10 is in the H position (a position indicated by an arrow in the figure).

Namely, in the embodiment, as shown in FIG. 4B, for example, when the gear selection lever 10 is situated in the H position (the position indicated by the arrow in the figure), the ON/OFF sensor S1 is in an area which faces the magnet 15d (S pole), the ON/OFF sensor S3 is in an area which faces the magnet 15c (N pole), and the ON/OFF sensors S2, S4 are in an area which faces the magnet 15B (S pole). In addition, the linear sensor R1 is in an area which faces a boundary between the magnet 15a (N pole) and the magnet 15b (S pole), and the linear sensor R2 is in an area which faces a boundary between the magnet 15b (S pole) and the magnet 15c (N pole).

The ON/OFF sensors S1, S2, S3, S4 are known switch operation type Hall sensors which output ON/OFF signals according to the intensity of magnetic flux densities of the N poles or S poles of the magnets they detect. In this embodiment, the ON/OFF sensors output ON (=1) signals when the N pole areas of the multipolar magnet plate 15 lie in positions facing the sensors and the magnetic flux density of the N pole is stronger than a predetermined value. In addition, the ON/OFF sensors output OFF (=0) signals when the N pole areas of the multipolar magnet plate 15 do not lie in the positions facing the sensors (namely, when the S pole areas of the multipolar magnet plate 15 lie in the positions facing the sensors) and the magnetic flux density of the N pole is weaker than the predetermined value or is substantially 0.

The linear sensors R1, R2 are known Hall sensors which output linearly output voltages according to the intensity of the magnetic flux densities of the N poles or S poles of the magnets they detect. In this embodiment, the linear sensors output H (high) signals in association with the output of an output voltage equal to or higher than a first threshold voltage (a high-output voltage) when the N pole areas of the multipolar magnet plate 15 lie in positions facing the sensors. In addition, the linear sensors output M (medium) signals in association with the output of an output voltage which resides within a predetermined range which is lower than the first threshold voltage and larger than a second threshold voltage (a medium output voltage) when the boundary between the N pole area and the S pole area of the multipolar magnet plate 15 lies in positions substantially facing the sensors. Furthermore, the linear sensors output L (low) signals in association with the output of an output voltage which is lower than the second threshold voltage (a low output voltage) when the N pole areas of the multipolar magnet plate 15 do not lie in the positions facing the sensors (namely, when the S pole areas lie in the positions facing the sensors).

Figure 5:
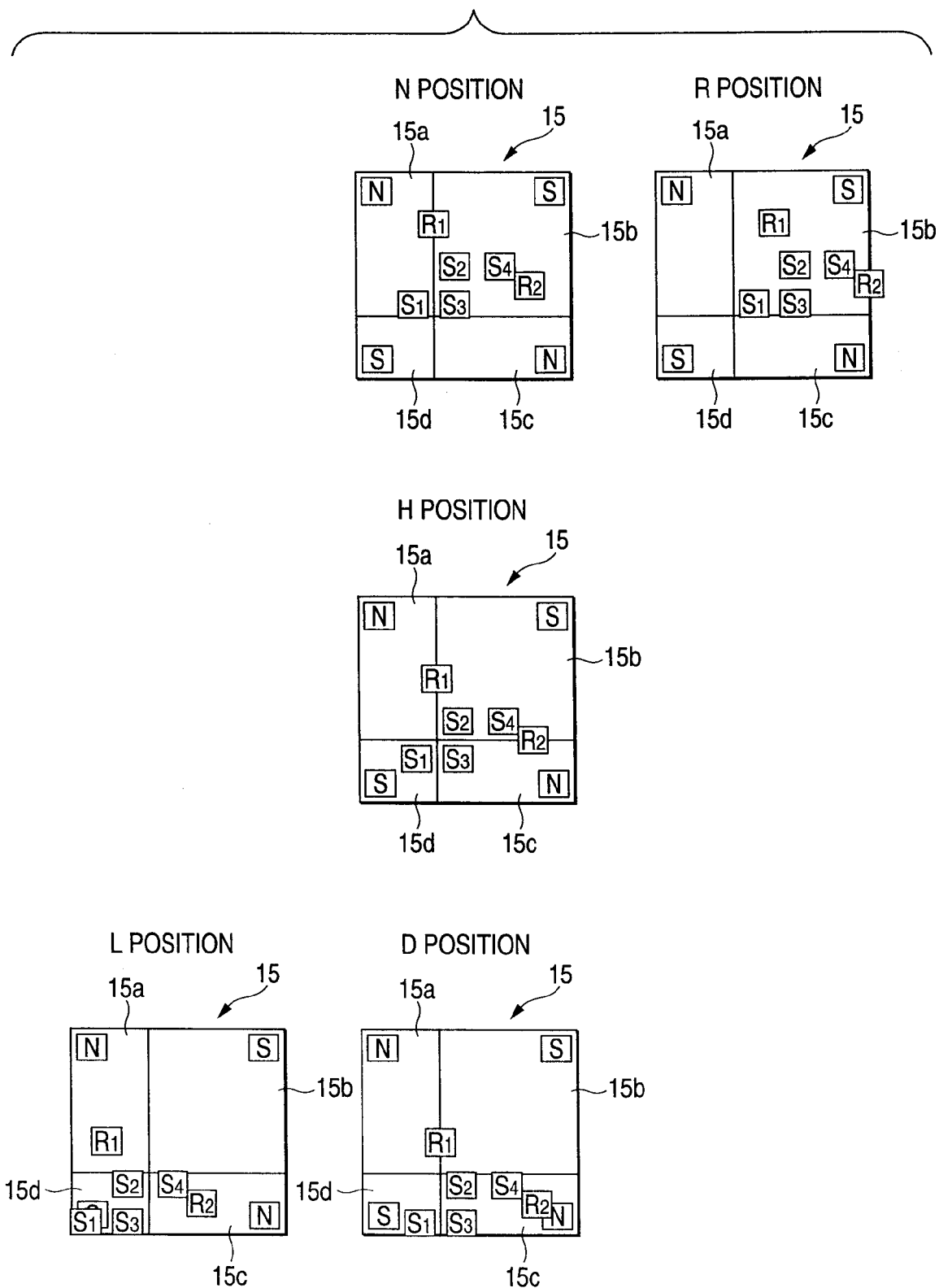
FIG. 5 shows relative positional relationships between the individual sensors and the multipolar magnet plate resulting when the gearshift lever is shifted into the individual gear selection positions.

Since the gear selection position detecting device 13 of the embodiment is configured as has been described above, a relative positional relationship between the individual sensors (ON/OFF sensors S1 to S4, the linear sensors R1, R2) and the multipolar magnet plate 15 (the magnets 15a to 15d) in the individual gear selection positions (R, N, H, D and L positions) when the gearshift lever 10 is shifted thereinto, respectively, will be as shown in FIG. 5. Note that the multipolar magnet plate 15 provided at the lower end portion of the gearshift lever 10 moves in an opposite direction to a direction in which the gearshift lever 10 is operated for gearshift, due to a rocking support mechanism (not shown) which is provided at an intermediate portion of the gearshift lever 10.

Namely, as shown in FIG. 5, with the H position of the gearshift lever 10 acting as a reference position, when the gearshift lever 10 is shifted into the N position, the multipolar magnet plate 15 moves to rearwards (towards the D position) relative to the individual sensors (the ON/OFF sensors S1 to S4, the linear sensors R1, R2). When the gearshift lever 10 is shifted into the D position, the multipolar magnet plate 15 moves forwards (towards the N position) relative to the individual sensors (the ON/OFF sensors S1 to S4, the linear sensors R1, R2). When the gearshift lever 10 is shifted into the R position, the multipolar magnet plate 15 moves left rearwards (towards to the L position) relative to the individual sensors (the ON/OFF sensors S1 to S4, the linear sensors R1, R2). When the gearshift lever 10 is shifted into the L position, the multipolar magnet plate 15 moves right forwards (towards the R position) relative to the individual sensors (the ON/OFF sensors S1 to S4, the linear sensors R1, R2).

By this configuration, sensor outputs which are outputted from the individual sensors (the ON/OFF sensors S1 to S4, the linear sensors R1, R2) when the gearshift lever 10 is shifted into the individual gear selection positions (R, N, H, D, L) will be as shown in FIG. 6. Note that in sensor outputs shown in FIG. 6, 1 denotes the ON signal, 0 denotes the OFF signal, H denotes the signal outputted when the output voltage is high (the high output voltage), M denotes the signal outputted when the output voltage is medium (the medium output voltage), and L denotes the signal outputted when the output voltage is low (the low output voltage).

Consequently, for example, when the gearshift lever 10 is shifted into the N position, sensor signals ("1, 0, 0, 0, 0, M, L) are outputted from the sensors (the ON/OFF sensors S1 to S4, the linear sensors R1, R2) individually to the control unit 2. The control unit 2 can then recognize based on the sensor signals so inputted thereinto that the gearshift device is in the N position.

That is, the ON/OFF sensors S1~S4 (primary magnetic sensors) and the linear sensors R1, R2 (secondary magnetic sensors) are provided in such a manner that when the gearshift lever 10 moves from one of the gear selection position to another gear selection position, at least one of the output of primary magnetic sensors and at least one of the output of the secondary sensor are changed, as shown in FIG. 6.

Thus, in the embodiment, as is obvious from the sensor output results shown in FIG. 6, in each of the gear selection positions (R, N, H, D, L) of the gearshift lever 10, the gear selection position can be detected based on the sensor signal outputted from each of the sensors (the ON/OFF sensors S1 to S4, the linear sensors R1, R2).

In addition, when two or more sensors are attempted to be arranged at each of the gear selection positions (each of the R, N, H, D and L positions) as done in the conventional example in order to detect a gear selection position while securing the redundancy even in the event that any of the sensors fails or there occurs a disconnection in a signal wire, in this case, at least 10 numbers of sensors are required. By using the gear selection position detecting device 13 of the embodiment, however, the detection of each of the gear selection positions (R, N, H, D, L) can be ensured while securing the redundancy with, for example, the six sensors (the ON/OFF sensors S1 to S4, the linear sensors R1, R2) Since the number of sensors can be reduced compared to the conventional example, the reduction in cost can be realized.

Note that the gear selection positions (R, N, H, D, L) of the gearshift lever 10, the layout pattern of the ON/OFF sensors S1 to S4 and the linear sensors R1, R2, and the layout pattern of the N poles and the S poles of the multipolar magnet plate 15 (the magnets 15a to 15d) in the aforesaid embodiment are the examples thereof, and the invention is not limited thereto.

In addition, while the ON/OFF sensors S1 to S4 in the embodiment are the sensors adapted to output the ON (=0) signals when the N pole areas of the multipolar magnet plate 15 lie in the positions facing the sensors and the magnetic flux density of the N pole is higher than the predetermined value, the ON/OFF sensors S1 to S4 can be made up of sensors which are configured so as to output ON signals (=0) when there occurs a change in polarity from the S pole to the N pole in association with the movement of the multipolar magnet plate 15 based on the detection property of the N pole and the detection property of the S pole of the multipolar magnet plate 15.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A gearshift device for an automatic transmission, comprising:
   a gearshift lever adapted to move a plurality of gear selection positions along a gearshift lever shifting groove; and
   a gear selection position detecting unit which detects a gear selection position into which the gearshift lever is operated to be shifted, the gear selection position detecting unit comprising:
   a magnet plate which is disposed at a lower end portion of the gearshift lever and is adapted to move in accordance with a movement of the gearshift lever; and
   a plurality of primary magnetic sensors and at least one secondary magnetic sensor, which are disposed so as to oppose to the magnet plate in a non-contact fashion at predetermined positions based on the individual gear selection positions, wherein
   the primary magnetic sensor detects magnetic flux density of the magnet plate and outputs ON/OFF signals in accordance with intensity of the detected magnetic flux density; and
   the secondary magnetic sensor detects magnetic flux density of the magnet plate and outputs a linear output value according to the detected magnitude of the magnetic flux density.

2. The gearshift device for an automatic transmission as set forth in claim 1, wherein
   the magnet plate is a multipolar magnet plate comprising a plurality of flat plate-shaped magnets disposed in such a manner that an N pole and an S pole lie adjacent to each other,
   the primary magnetic sensor outputs the ON/OFF signals when the primary magnetic sensor detects changes in a detection property in the N pole and a detection property in the S pole, and wherein
   the secondary magnetic sensor output the linear output value in accordance with the detected magnetic flux density of the N or S poles of the multipolar magnet plate.

3. The gearshift device for an automatic transmission as set forth in claim 1, wherein
   the primary and secondary magnetic sensors are provided in such a manner that:
   when the gearshift lever moves from one of the gear selection position to another gear selection position, at least one of the output of primary magnetic sensors and at least one of the output of the secondary sensor are changed.

4. The gearshift device for an automatic transmission as set forth in claim 1, wherein the gear selection position detecting unit determines the output of the secondary magnetic sensor as one of high, medium, and low outputs in accordance with the linear output of the secondary magnetic sensor.

5. A gearshift device for an automatic transmission, comprising:
   a gearshift lever adapted to move a plurality of gear selection positions along a gearshift lever shifting groove; and
   a gear selection position detecting unit which detects a gear selection position into which the gearshift lever is operated to be shifted, the gear selection position detecting unit comprising:
   a magnet plate which is disposed at a lower end portion of the gearshift lever and is adapted to move in accordance with a movement of the gearshift lever, wherein the magnet plate is a multipolar magnet plate comprising a plurality of flat plate-shaped magnets disposed in such a manner that an N pole and an S pole lie adjacent to each other; and
   a plurality of primary magnetic sensors and at least one secondary magnetic sensor, which are disposed so as to oppose to the magnet plate in a non-contact fashion at predetermined positions based on the individual gear selection positions, wherein
   the primary magnetic sensor detects magnetic flux density of the magnet plate and outputs ON/OFF signals in accordance with intensity of the detected magnetic flux density, wherein the primary magnetic sensor outputs the ON/OFF signals when the primary magnetic sensor detects changes in a detection property in the N pole and a detection property in the S pole, and the secondary magnetic sensor detects magnetic flux density of the magnet plate and outputs an output value according to the detected magnitude of the magnetic flux density, wherein the secondary magnetic sensor output the output value in accordance with the detected magnetic flux density of the N or S poles of the multipolar magnet plate.

6. The gearshift device for an automatic transmission as set forth in claim 5, wherein the primary and secondary magnetic sensors are provided in such a manner that:

when the gearshift lever moves from one of the gear selection position to another gear selection position, at least one of the output of primary magnetic sensors and at least one of the output of the secondary sensor are changed.

* * * * *